United States Patent
Komiya

(10) Patent No.: US 10,018,249 B2
(45) Date of Patent: Jul. 10, 2018

(54) DEVICE FOR GUIDING LONG OBJECT

(71) Applicant: TSUBAKIMOTO CHAIN CO., Osaka-shi, Osaka (JP)

(72) Inventor: Shoichiro Komiya, Osaka (JP)

(73) Assignee: TSUBAKIMOTO CHAIN CO., Osaka-shi (JP)

( * ) Notice: Subject to any disclaimer, the term of this patent is extended or adjusted under 35 U.S.C. 154(b) by 0 days.

(21) Appl. No.: 15/557,899

(22) PCT Filed: Mar. 11, 2016

(86) PCT No.: PCT/JP2016/057794
§ 371 (c)(1),
(2) Date: Sep. 13, 2017

(87) PCT Pub. No.: WO2016/152585
PCT Pub. Date: Sep. 29, 2016

(65) Prior Publication Data
US 2018/0051773 A1    Feb. 22, 2018

(30) Foreign Application Priority Data

Mar. 20, 2015 (JP) ................................. 2015-058410

(51) Int. Cl.
| | |
|---|---|
| *F16G 13/16* | (2006.01) |
| *H02G 15/24* | (2006.01) |
| *H02G 11/00* | (2006.01) |

(52) U.S. Cl.
CPC ............. *F16G 13/16* (2013.01); *H02G 15/24* (2013.01); *H02G 11/00* (2013.01)

(58) Field of Classification Search
CPC ................................ F16G 13/16; H02G 15/24
(Continued)

(56) References Cited

U.S. PATENT DOCUMENTS 4,658,577 A * 4/1987 Klein .................. H02G 11/006
   248/49
5,711,144 A * 1/1998 Pea .......................... F16G 13/16
   248/49
(Continued)

FOREIGN PATENT DOCUMENTS

| | | |
|---|---|---|
| DE | 3431531 A1 | 3/1986 |
| FR | 2 882 418 A1 | 8/2006 |
| JP | 10-508934 A | 9/1998 |

OTHER PUBLICATIONS

International Search Report dated May 24, 2016, issued in counterpart of International Application No. PCT/JP2016/057794 (1 page).
(Continued)

*Primary Examiner* — David B Jones
(74) *Attorney, Agent, or Firm* — Westerman, Hattori, Daniels & Adrian, LLP

(57) ABSTRACT

A long object guiding device includes pivotally coupled links. Each link includes a pair of link portions facing each other in a width direction. The links are pivotally coupled together in a state in which the links are arranged in series in a serial direction. A first link and a second link, which are adjacent to each other in the serial direction, are pivotal between a first state and a second state. Each link portion has a first engaging portion and first and second restricting members. An opening is formed between the first restricting member and the second restricting member. When the first and second links are located in a third state between the first state and the second state, the first engaging portion of the second link is aligned with the opening of the first link in the width direction.

4 Claims, 3 Drawing Sheets

(58) Field of Classification Search
USPC .......................................................... 59/78.1
See application file for complete search history.

(56) References Cited

U.S. PATENT DOCUMENTS

| | | | | |
|---|---|---|---|---|
| 7,017,328 | B2* | 3/2006 | Komiya | ................... F16G 13/16 |
| | | | | 248/49 |
| 7,045,705 | B2* | 5/2006 | Ikeda | ...................... F16G 13/16 |
| | | | | 138/120 |
| 7,249,452 | B2* | 7/2007 | Komiya | ................... F16G 13/16 |
| | | | | 248/49 |
| 7,849,667 | B2* | 12/2010 | Jaeker | ...................... F16G 13/16 |
| | | | | 248/49 |
| 9,809,179 | B2* | 11/2017 | Inoue | .................. B60R 16/0215 |
| 2011/0173946 | A1* | 7/2011 | Yamashita | .............. F16G 13/16 |
| | | | | 59/78.1 |

OTHER PUBLICATIONS

International Preliminary Report on Patentability (Form PCT/IB/373) issued in counterpart International Application No. PCT/JP2016/057794, with Form PCT/ISA/237. (7 pages).

* cited by examiner

DEVICE FOR GUIDING LONG OBJECT

TECHNICAL FIELD

The present invention relates to a long object guiding device that guides a long object, such as a flexible cable for supplying electricity or a hose for supplying fluid to a movable unit, such as a machine tool, in accordance with movement of the movable unit while accommodating the long object.

This type of the long object guiding device is also referred to as an energy guide chain and is formed by coupling multiple links in series (for example, Patent Document 1). Each link of the long object guiding device disclosed in Patent Document 1 includes a pair of link portions (side members) and an arm (cross bar). The pair of link portions face each other in a width direction, which is orthogonal to the serial direction. The arm couples the pair of link portions. A long object is accommodated in an accommodation space defined by multiple pairs of link portions and multiple arms.

When the ends of each link portion in the serial direction are referred to as a front end and a rear end, the front end includes a through-hole (cut-out portion) and an arcuate guide groove, and the rear end includes a protruding portion (coupling bolt) and an arcuate projection. In first link portions and second link portions that are adjacent to each other, one behind the other, the protruding portions and the projections of the second link portions are fitted in the through-holes and the guide grooves of the first link portions so that the first link portions and second link portions are coupled to be pivotal within a predetermined pivoting range. In this case, even if an external force is applied to the first and second link portions from the side, the fitting between the guide grooves and the projections prevents the first and second link portions from being easily disengaged.

PRIOR ART DOCUMENT

Patent Document

Patent Document 1: Japanese National Phase Laid-Open Patent Publication No. 10-508934

SUMMARY OF THE INVENTION

In the above-described long object guiding device, the projections of the first link portions are fitted to the guide grooves of the second link portions along the entire pivoting range. Thus, although the first and second link portions are restrained from being disengaged, the configuration hinders the coupling operation of the first and second link portions and thus hinders the assembly of the long object guiding device.

Accordingly, it is an objective of the present invention to provide a long object guiding device that is easily assembled.

Hereinafter, means for solving the above-described problems and operational advantages will be described.

To achieve the foregoing objective and in accordance with one aspect of the present invention, a long object guiding device that includes a plurality of links pivotally coupled to each other is provided. Each link includes a pair of link portions that face each other in a first direction. The links are pivotally coupled together in a state in which the links are arranged in series in a second direction orthogonal to the first direction. The links include a first link and a second link that are adjacent to each other in the second direction. The first link and the second link are pivotal between a first state, in which longitudinal axes of the link portions of the first link match with longitudinal axes of the link portions of the second link, and a second state, in which the longitudinal axes of the link portions of the first link intersect with the longitudinal axes of the link portions of the second link. Each link portion includes an engaging portion provided at a first end in the second direction and a restricting portion located apart from the engaging portion in the second direction. When the restricting portion of each link portion is aligned, in the first direction, with the engaging portion of the link portion that is adjacent in the second direction, the restricting portion restricts movement of the engaging portion of the adjacent link portion in the first direction. The restricting portion includes a first restricting member and a second restricting member. An opening portion is formed between the first restricting member and the second restricting member. When the first link and the second link are located in the first state, the engaging portion of the second link is aligned with the first restricting member of the first link in the first direction. When the first link and the second link are located in the second state, the engaging portion of the second link is aligned with the second restricting member of the first link in the first direction. When the first link and the second link are located in a third state between the first state and the second state, the engaging portion of the second link is aligned with the opening portion of the first link in the first direction.

With this configuration, when the first and second links that are adjacent to each other in the second direction are coupled together such that the first and second links are located in the third state between the first state and the second state, the engaging portion of the second link corresponds to the opening portion of the first link. Thus, the engaging portion of the second link does not engage with the first and second restricting members of the first link. This facilitates the coupling operation of the first and second links and thus facilitates the assembly of the long object guiding device.

In the above-described long object guiding device, the engaging portion is a first engaging portion. Each link portion further preferably includes a second engaging portion located at the first end in the second direction adjacent to the first engaging portion. When the first link and the second link are preferably located in the first state, the second engaging portion of the second link is aligned with the second restricting member of the first link in the first direction.

With this configuration, if an external force that acts to twist the first and second links is applied when the first and second links are located in the first state, the first engaging portion and the second engaging portion of the second link engage with the first restricting member and the second restricting member of the first link in the first direction. This effectively restrains the first and second links from being disengaged.

In the above-described long object guiding device, each link is a single component.

This configuration contributes to reduction in the number of components of the long object guiding device.

In the above-described long object guiding device, a direction orthogonal to the first direction and the second direction is a third direction. Each link further preferably includes an arm that couples the pair of link portions at a first end in the third direction, and a pair of extensions extending inward from the pair of link portions in the first direction at a second end in the third direction. The extensions face each other and are elastically deformable. A gap is formed between the pair of extensions.

With this configuration, if the gap between each pair of extensions is set to be smaller than the outer diameter of the long object, the long object is pushed into an accommodation space in the links through the gaps between the pairs of extensions from the outside. Thus, the pairs of extensions are elastically deformed, and the gap between the extensions is enlarged to be greater than the outer diameter of the long object. In this manner, the long object is accommodated in the accommodation space. After the long object is accommodated in the accommodation space, the pairs of extensions are restored to the original shape by the elastic restoration force of the pairs of extensions. The gaps between the pairs of extensions also return to the original size. Thus, the long object is easily accommodated in the accommodation space from the outside, and the long object accommodated in the accommodation space is restrained from coming out through the gaps between the pairs of extensions.

In the above-described long object guiding device, a width of each extension in the second direction is preferably narrower than a width of each arm in the second direction.

With this configuration, since the pairs of extensions are elastically deformed easily, the long object is easily accommodated in the accommodation space in the links through the gaps between the pairs of extensions from the outside.

According to the present invention, the assembly of the long object guiding device is easily performed.

DETAILED DESCRIPTION OF THE PREFERRED EMBODIMENTS

A long object guiding device according to one embodiment will now be described with reference to the drawings.

Figure 1:
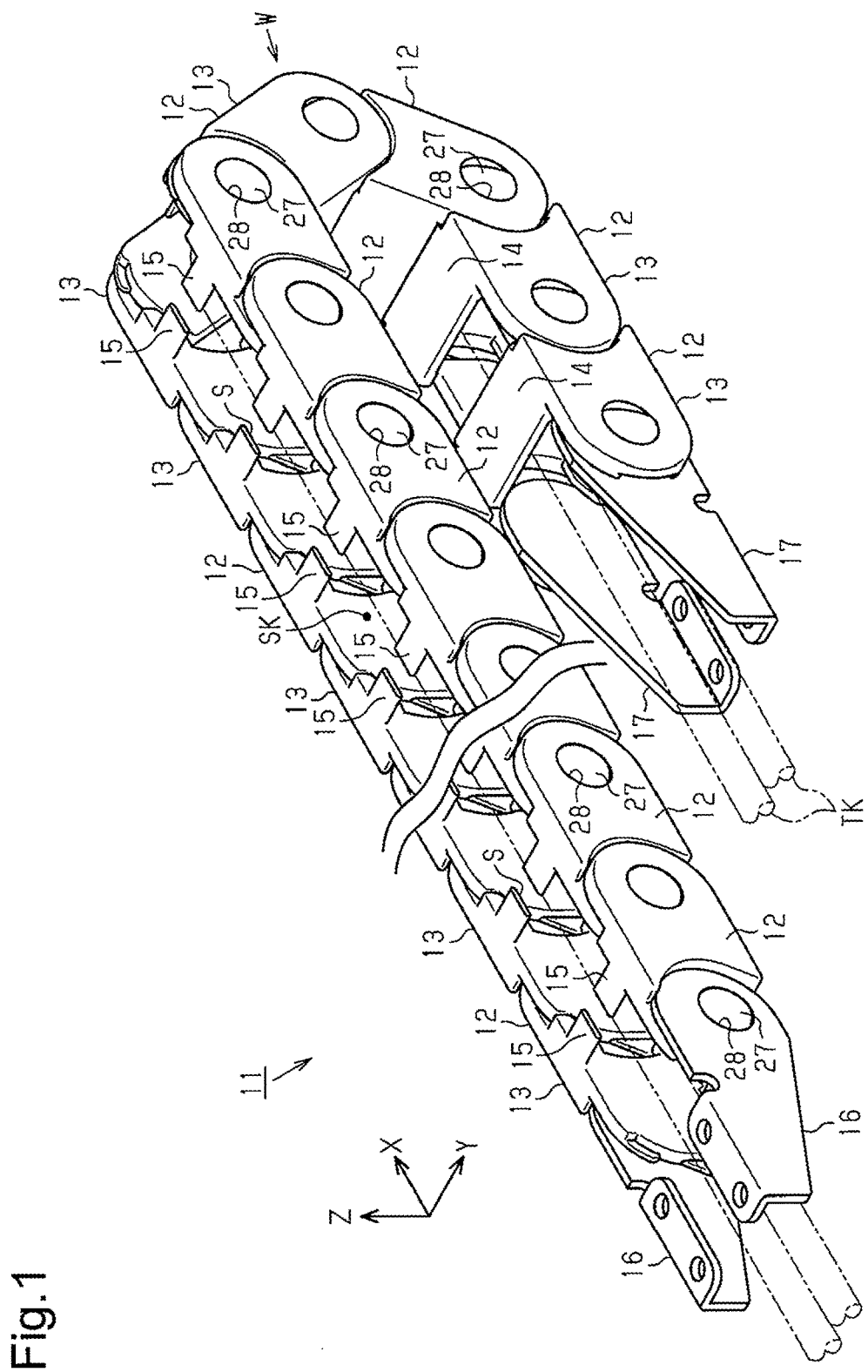
FIG. 1 is a perspective view of a long object guiding device according to one embodiment.

As shown in FIG. 1, a long object guiding device 11 includes multiple links 13. Each link 13 includes a pair of link portions 12, which face each other in a width direction Y (first direction). The links 13 are pivotally coupled to one another in a state in which the links 13 are arranged in series in a serial direction X (second direction), which is orthogonal to the width direction Y.

The pair of link portions 12 of each link 13 are coupled to each other by a substantially rectangular plate-shaped arm 14 at a first end of the link 13 in a thickness direction Z. The thickness direction Z is orthogonal to the width direction Y and the serial direction X and corresponds to a third direction. A pair of elastically deformable extensions 15 is provided at a second end of each link 13 in the thickness direction Z to correspond to the pair of link portions 12. The pair of extensions 15 have a substantially rectangular plate-like shape and extend inward in the width direction Y to face each other. That is, in each link 13, the arm 14 and the pair of extensions 15 face each other in the thickness direction Z.

The width of each extension 15 in the serial direction X is set to be narrower than the width of the arm 14 in the serial direction X. A gap S is formed between the pair of extensions 15 in the width direction Y. The dimension of the gap S in the width direction Y is set to be narrower than the outer diameter of a long object TK, which will be discussed below.

The arm 14 and the pair of extensions 15 of each link 13 face each other in the thickness direction Z. Each link 13 is formed as a single component by integrally molding the pair of link portions 12, the arm 14, and the pair of extensions 15 with a synthetic plastic material.

A first bracket 16 is coupled to one of the links 13 located at the leading end in the serial direction X. The first bracket 16 is for coupling the link 13 to a movable body (not shown) that reciprocates in the serial direction X. A second bracket 17 is coupled to one of the links 13 located at the trailing end in the serial direction X. The second bracket 17 is for securing the link 13 to a securing portion (not shown).

A space that is defined by the pairs of link portions 12, the arms 14, and the pairs of extensions 15 of the links 13 and extends in the serial direction X configures an accommodation space SK. The accommodation space SK accommodates long objects TK, which are capable of being flexibly bent. The long object guiding device 11 guides the long objects TK in accordance with the reciprocation of the movable body (not shown), which is coupled to the first bracket 16, while protecting the long objects TK, which are accommodated in the accommodation space SK.

In this case, the long object guiding device 11 is located such that a curved portion W is formed in the middle portion. The curved portion W moves in accordance with the reciprocation of the movable body (not shown), which is coupled to the first bracket 16, in the serial direction X.

The long objects TK include, for example, an electric cable for supplying electricity to the movable body (not shown), an optical fiber cable for transmitting signals to the movable body (not shown), a hose for supplying gas (for example, air) or liquid (for example, water or oil) to the movable body (not shown), and a long articulated member capable of flexibly bending.

Next, the configuration of the pair of link portions 12 of each link 13 will be described.

Figure 2:
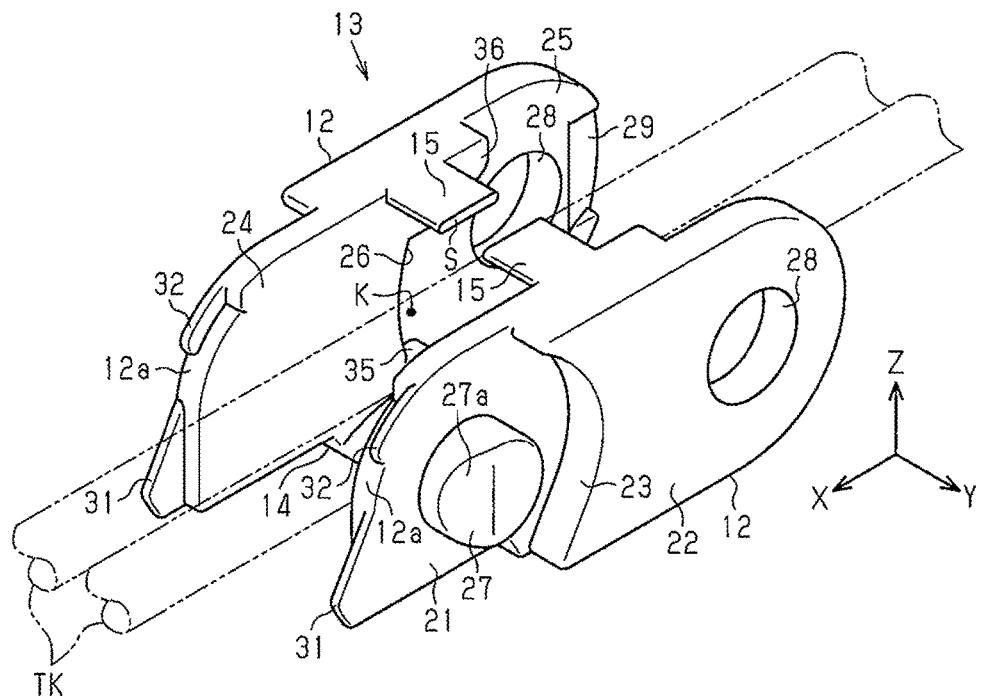
FIG. 2 is a perspective view of a link of the long object guiding device in FIG. 1.
Figure 3:
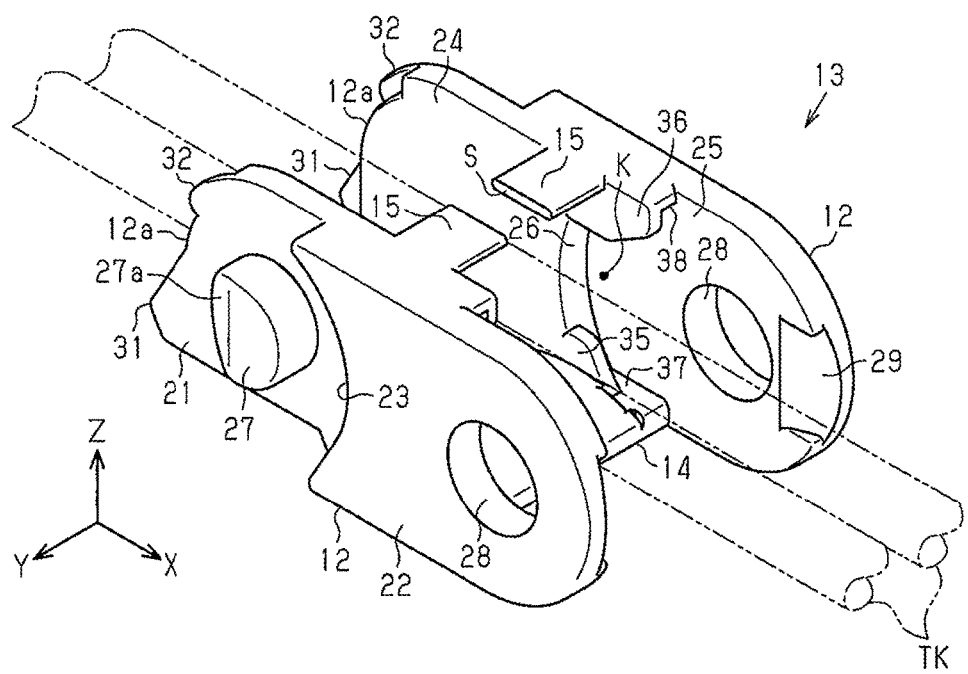
FIG. 3 is a perspective view of a link of the long object guiding device in FIG. 1.

As shown in FIGS. 2 and 3, each link portion 12 has a substantially rectangular plate shape in which both ends in the serial direction X are rounded. Each link portion 12 includes a first outer surface 21 and a second outer surface 22 arranged in the serial direction X. The first outer surface 21 is located inward of the second outer surface 22 in the width direction Y. A substantially arcuate outer stepped surface 23 is formed between the first outer surface 21 and the second outer surface 22 to connect the first and second outer surfaces 21, 22. Each link portion 12 further includes a first inner surface 24 and a second inner surface 25 arranged in the serial direction X. The first inner surface 24 is located inward of the second inner surface 25 in the width direction Y. An inner stepped surface 26 is formed between the first inner surface 24 and the second inner surface 25 to connect the first and second inner surfaces 24, 25.

In each link portion 12, the first outer surface 21 includes a circular protruding portion 27, and the second outer surface 22 includes a circular hole 28 extending through the link portion 12. The protruding portion 27 of another link portion 12 that is adjacent in the serial direction X is inserted in the hole 28 of each link portion 12 to be pivotal relative to each other. A first inclined surface 27a is formed at the distal end surface of the protruding portion 27 of each link portion 12. The first inclined surface 27a is inclined such that the distance from the first outer surface 21 is gradually reduced from the center portion of the distal end surface toward the outer circumference.

A second inclined surface 29 is formed on the outer end portion of the second inner surface 25 of each link portion 12. The second inclined surface 29 is inclined to correspond to the first inclined surface 27a of the protruding portion 27 of another link portion 12 that is adjacent in the serial direction X. An arcuate distal end surface 12a is formed in the vicinity of the protruding portion 27 of each link portion 12. A first engaging portion 31 is formed on the distal end surface 12a of each link portion 12 at a position closer to the arm 14 than the extension 15. The first engaging portion 31 is a plate thinner than the thickness of the link portion 12.

A second engaging portion 32 is formed on the distal end surface 12a of each link portion 12 at a position closer to the extension 15 than the arm 14. That is, in each link portion 12, the second engaging portion 32 is located adjacent to the first engaging portion 31. The second engaging portion 32 is a plate thinner than the thickness of the link portion 12.

In the present embodiment, the thickness of the first engaging portion 31 and the second engaging portion 32 is set to approximately half the thickness of the link portion 12. The maximum projection amount of the second engaging portion 32 from the distal end surface 12a is set to be less than the maximum projection amount of the first engaging portion 31 from the distal end surface 12a. In the present embodiment, the maximum projection amount of the second engaging portion 32 from the distal end surface 12a is set to approximately half the maximum projection amount of the first engaging portion 31 from the distal end surface 12a.

A first restricting member 35, which configures a restricting portion, is formed on the inner stepped surface 26 of each link portion 12 in the vicinity of the arm 14. The first restricting member 35 is shaped as a plate thinner than the thickness of the link portion 12 and has a surface flush with the first inner surface 24. A second restricting member 36, which configures a restricting portion, is formed on the inner stepped surface 26 of each link portion 12 in the vicinity of the extension 15. The second restricting member 36 is shaped as a plate thinner than the thickness of the link portion 12 and has a surface flush with the first inner surface 24. As described above, in each link portion 12, the first engaging portion 31 and the second engaging portion 32 are located at a first end of the link portion 12 in the serial direction X, and the first restricting member 35 and the second restricting member 36, which configure the restricting portions, are located apart from the first engaging portion 31 and the second engaging portion 32 in the serial direction X.

When the first restricting member 35 of each link portion 12 is aligned in the width direction Y with the first engaging portion 31 of the link portion 12 that is adjacent to the link portion 12 in the serial direction X, the first restricting member 35 restricts movement of the first engaging portion 31 of the adjacent link portion 12 in the width direction Y. When the second restricting member 36 of each link portion 12 is aligned in the width direction Y with the first engaging portion 31 or the second engaging portion 32 of the link portion 12 that is adjacent to the link portion 12 in the serial direction X, the second restricting member 36 restricts movement of the first engaging portion 31 or the second engaging portion 32 of the adjacent link portion 12 in the width direction Y. An opening portion K is formed between the first restricting member 35 and the second restricting member 36 of each link portion 12 in the thickness direction Z. That is, a space is formed between the first restricting member 35 and the second restricting member 36 of each link portion 12 in the thickness direction Z.

A first contact surface 37 is formed between the first restricting member 35 and the second inner surface 25 of each link portion 12. The first contact surface 37 is perpendicular to the thickness direction Z and intersects the inner stepped surface 26. A second contact surface 38 is formed between the second restricting member 36 and the second inner surface 25 of each link portion 12. The second contact surface 38 is perpendicular to the thickness direction Z and is continuous with the inner stepped surface 26.

In the following description, two adjacent links 13 in the serial direction X will be referred to as first and second links 13a, 13b. When the protruding portions 27 of the pair of link portions 12 of the second link 13b are inserted in the holes 28 of the pair of link portions 12 of the first link 13a, the first and second links 13a, 13b are coupled to each other. The first and second links 13a, 13b are pivotal between a first state (state shown in FIG. 4), in which the longitudinal axes of the link portions 12 of the first link 13a match with the longitudinal axes of the link portions 12 of the second link 13b, and a second state (state shown in FIG. 6), in which the longitudinal axes of the link portions 12 of the first link 13a intersect the longitudinal axes of the link portions 12 of the second link 13b. The longitudinal axis of each link portion 12 corresponds to an axis that extends perpendicular to the central axes that include the central axis of the circular protruding portion 27 and the central axis of the circular hole 28 of the link portion 12.

More specifically, in the long object guiding device 11 according to the present embodiment, when the first and second links 13a, 13b are located in the first state, the angle between the first link 13a and the second link 13b, that is, the angle between the longitudinal axes of the link portions 12 of the first link 13a and the longitudinal axes of the link portions 12 of the second link 13b is zero degrees. When the first and second links 13a, 13b are located in the second state, the angle between the first link 13a and the second link 13b, that is, the angle between the longitudinal axes of the link portions 12 of the first link 13a and the longitudinal axes of the link portions 12 of the second link 13b is 60 degrees.

Figure 4:
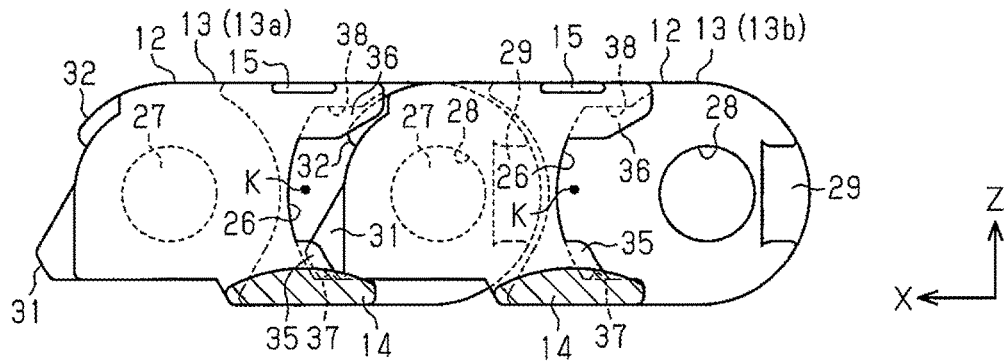
FIG. 4 is a cross-sectional view of the long object guiding device in FIG. 1, illustrating a state in which two adjacent links are located in a first state.
Figure 6:
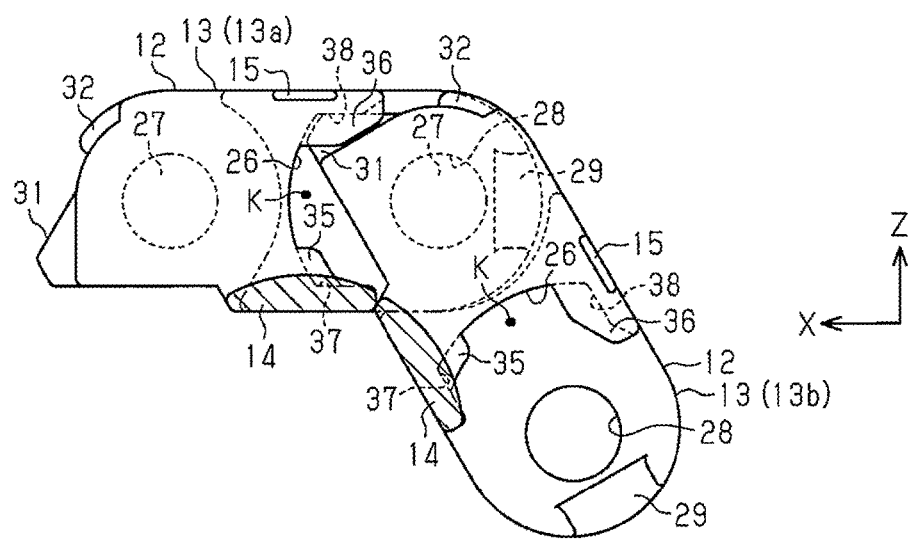
FIG. 6 is a cross-sectional view of the two adjacent links in FIG. 4, illustrating a state in which the links are located in a second state.

As shown in FIG. 4, when the first and second links 13a, 13b are located in the first state, the first engaging portions 31 of the second link 13b abut against the first contact surfaces 37 of the first link 13a. As shown in FIG. 6, when the first and second links 13a, 13b are located in the second state, the first engaging portions 31 of the second link 13b abut against the second contact surfaces 38 of the first link 13a.

That is, since the first engaging portions 31 selectively abut against the first contact surfaces 37 and the second contact surfaces 38, the pivoting range of the two links 13 (link portions 12) adjacent to each other in the serial direction X is restricted to an angular range of 0 to 60 degrees.

As shown in FIG. 4, when the first and second links 13a, 13b are located in the first state, the first engaging portions 31 and the second engaging portions 32 of the second link 13b are aligned with the first restricting members 35 and the second restricting members 36 of the first link 13a in the width direction Y.

As shown in FIG. 6, when the first and second links 13a, 13b are located in the second state, the first engaging portions 31 of the second link 13b are aligned with the second restricting members 36 of the first link 13a in the width direction Y. At this time, the second engaging portions 32 of the second link 13b are not aligned with the first restricting members 35 or the second restricting members 36 of the first link 13a in the width direction Y.

Figure 5:
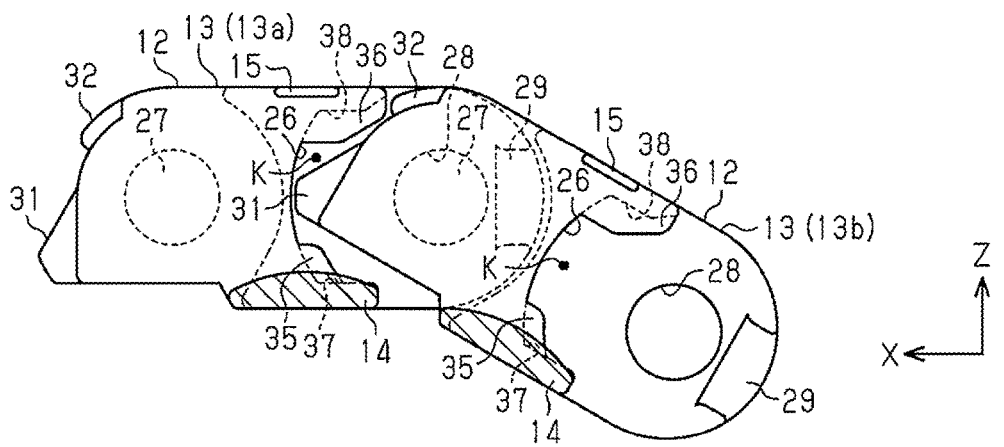
FIG. 5 is a cross-sectional view of the two adjacent links in FIG. 4, illustrating a state in which the links are located in a third state.

As shown in FIG. 5, when the first and second links 13a, 13b are located in a third state (state shown in FIG. 5), the first engaging portions 31 of the second link 13b are aligned with the opening portions K of the first link 13a in the width direction Y. The third state corresponds to a state between the first state and the second state. At this time, the first engaging portions 31 and the second engaging portions 32 of the second link 13b are not aligned either with the first restricting members 35 or the second restricting members 36 of the first link 13a in the width direction Y. According to the long object guiding device 11 of the present embodiment, when the first and second links 13a, 13b are located in the third state, the angle between the first link 13a and the second link 13b is 30 degrees. That is, in the first and second links 13a, 13b located in the third state, the angle between the longitudinal axes of the link portions 12 of the first link 13a and the longitudinal axes of the link portions 12 of the second link 13b is 30 degrees.

Next, the operation of the long object guiding device 11 when in use will be described.

When the long object guiding device 11 shown in FIG. 1 is used, first, the long objects TK are pushed into the accommodation space SK in the links 13 through the gap S between each pair of extensions 15 from the outside. Thus, each pair of extensions 15 is elastically deformed and the gap S between the extensions 15 is enlarged to be greater than the outer diameter of each long object TK. In this manner, the long objects TK are accommodated in the accommodation space SK.

After the long objects TK are accommodated in the accommodation space SK, each pair of extensions 15 returns to the original shape by the elastic restoration force of the extensions 15, and the gap S between each pair of extensions 15 is also restored to the original size. Thus, the long objects TK accommodated in the accommodation space SK are restrained from coming out of the gap S between each pair of extensions 15. In this manner, the long objects TK are set inside the long object guiding device 11.

When the movable body (not shown) reciprocates in the serial direction X, the long object guiding device 11 reciprocates in the serial direction X such that the curved portion W is displaced following the movable body (not shown). The long objects TK, which are accommodated in the accommodation space SK, are guided by the long object guiding device 11 in accordance with movement of the movable body (not shown) while being protected.

At this time, in the long object guiding device 11, the first and second links 13a, 13b, which are adjacent to each other in the serial direction X, are pivoted repeatedly between the first state and the second state in accordance with the reciprocation of the curved portion W. Thus, the first engaging portions 31 of the second link 13b are sequentially and repeatedly abutted against the first contact surfaces 37 and the second contact surfaces 38 of the first link 13a.

In this case, since the thickness of the first engaging portions 31 is set to be thinner than the thickness of the link portions 12 in each link 13, the contact area of the first engaging portions 31 with respect to the first contact surfaces 37 and the second contact surfaces 38 is reduced compared with a case in which the thickness of the first engaging portions 31 is set to be the same as the thickness of the link portions 12. This reduces the sound (noise) that is generated when the first engaging portions 31 of the second link 13b abut against the first contact surfaces 37 and the second contact surfaces 38 of the first link 13a.

When the long object guiding device 11 is used, an external force that acts to twist the long object guiding device 11 might be applied. If such an external force is applied to the long object guiding device 11, the adjacent links 13 flex greatly as to be twisted since, in particular, the link portions 12 are not coupled to each other in the vicinity of the pair of extensions 15 of each link 13.

Thus, the long object guiding device 11 also receives force that causes the protruding portions 27 of the second link 13b to come off the holes 28 of the first link 13a among the first and second links 13a, 13b, which are adjacent to each other in the serial direction X, that is, force in the width direction Y. This may possibly disengage the first and second links 13a, 13b.

In this respect, in the long object guiding device 11 of the present embodiment, when the first and second links 13a, 13b are located in the first state, the first engaging portions 31 and the second engaging portions 32 of the second link 13b are aligned with the first restricting members 35 and the second restricting members 36 of the first link 13a in the width direction Y.

Thus, even if force is applied to the long object guiding device 11 in the width direction Y, the first engaging portions 31 and the second engaging portions 32 of the second link 13b engage with the first restricting members 35 and the second restricting members 36 of the first link 13a. This effectively restrains the protruding portions 27 of the second link 13b from coming off the holes 28 of the first link 13a.

In the long object guiding device 11 of the present embodiment, when the first and second links 13a, 13b are located in the second state, the first engaging portions 31 of the second link 13b are aligned with the second restricting members 36 of the first link 13a in the width direction Y. Thus, even if force is applied to the long object guiding device 11 in the width direction Y, the first engaging portions 31 of the second link 13b engage with the second restricting members 36 of the first link 13a. This restrains the protruding portions 27 of the second link 13b from coming off the holes 28 of the first link 13a.

In this manner, if an external force that acts to twist the long object guiding device 11 of the present embodiment is applied during usage, the protruding portions 27 of the second link 13b are restrained from coming off the holes 28 of the first link 13a regardless of whether the first and second links 13a, 13b, which are adjacent to each other in the serial direction X, are in the first state or in the second state. This configuration restrains the first and second links 13a, 13b from being disengaged.

Next, a method for assembling the long object guiding device 11 will be described.

The links 13 need to be coupled together in series to assemble the long object guiding device 11. To couple the first link 13a and the second link 13b, first, the first inclined surfaces 27a of the protruding portions 27 of the second link 13b are abutted against the second inclined surfaces 29 of the first link 13a. At this time, the second link 13b is tilted with respect to the first link 13a by 30 degrees. That is, the first and second links 13a, 13b are located such that the angle between the longitudinal axes of the link portions 12 of the first link 13a and the longitudinal axes of the link portions 12 of the second link 13b is 30 degrees, and the first engaging portions 31 of the second link 13b are placed to correspond to the opening portions K of the first link 13a. Each opening portion K is formed between the first restricting member 35 and the second restricting member 36.

Subsequently, the first and second links 13a, 13b are relatively moved while being flexed such that the protruding portions 27 of the second link 13b are aligned with the holes 28 of the first link 13a. When the protruding portions 27 of the second link 13b are aligned with the holes 28 of the first link 13a, the first and second links 13a, 13b, which have been flexed, return to the original shape by the elastic restoration force of the first and second links 13a, 13b. This causes the protruding portions 27 of the second link 13b to be pivotally inserted into the holes 28 of the first link 13a.

At this time, the first engaging portions 31 of the second link 13b pass through the opening portions K of the first link 13a. That is, as shown in FIG. 5, the first engaging portions 31 of the second link 13b are temporarily inserted in the opening portions K of the first link 13a. Thus, the first link 13a and the second link 13b are smoothly coupled together. After sequentially coupling multiple links 13 in series in the same manner as described above, the links 13 that are located at the leading end and the trailing end are respectively coupled to the first bracket 16 and the second bracket 17 to complete the long object guiding device 11.

In this manner, when the first and second links 13a, 13b are coupled together such that the first and second links 13a, 13b are located in the third state, which is between the first state and the second state, the first engaging portions 31 of the second link 13b correspond to the opening portions K of the first link 13a. Thus, the first engaging portions 31 of the second link 13b do not engage with the first restricting members 35 or the second restricting members 36 of the first link 13a. This facilitates the coupling operation of two links 13 and thus facilitates the assembly of the long object guiding device 11.

In each link 13, if a third restricting member that is similar to the first restricting member 35 and the second restricting member 36 is formed between each first restricting member 35 and the associated second restricting member 36 without a gap, there will be no space for the first engaging portions 31 of the second link 13b to enter the first link 13a when the first and second links 13a, 13b are coupled together. This configuration will hinder the coupling operation of two links 13 and thus hinder the assembly of the long object guiding device 11.

The above-described embodiment achieves the following advantages.

(1) In the long object guiding device 11, when the first and second links 13a, 13b, which are adjacent to each other in the serial direction X, are located in the third state, which is between the first state and the second state, the first engaging portions 31 of the second link 13b are aligned with the opening portions K of the first link 13a in the width direction Y. Thus, when the first and second links 13a, 13b are coupled together such that the first and second links 13a, 13b are located in the third state, the first engaging portions 31 of the second link 13b correspond to the opening portions K of the first link 13a, and the first engaging portions 31 of the second link 13b do not engage with the first restricting members 35 or the second restricting members 36 of the first link 13a, that is, the restricting portions of the first link 13a. This facilitates the coupling operation of the first and second links 13a, 13b and thus facilitates the assembly of the long object guiding device 11.

(2) In the long object guiding device 11, when the first and second links 13a, 13b are located in the first state, the first engaging portions 31 and the second engaging portions 32 of the second link 13b are aligned with the first restricting members 35 and the second restricting members 36 of the first link 13a in the width direction Y. Thus, if an external force is applied that acts to twist the first and second links 13a, 13b located in the first state, the first engaging portions 31 and the second engaging portions 32 of the second link 13b engage with the first restricting members 35 and the second restricting members 36 of the first link 13a in the width direction Y. This effectively restrains the protruding portions 27 of the second link 13b from coming off the holes 28 of the first link 13a and effectively restrains the first and second links 13a, 13b from being disengaged.

(3) In the long object guiding device 11, each link 13 is configured as a single component. This contributes to reduction in the number of components configuring the long object guiding device 11.

(4) In the long object guiding device 11, each link 13 includes the arm 14 and the pair of extensions 15, which are elastically deformable. The arm 14 couples the pair of link portions 12 with each other at the first end in the thickness direction Z. The extensions 15 extend inward from the pair of link portions 12 in the width direction Y at the second end in the thickness direction Z and face each other. The gap S is formed between the pair of extensions 15. With the gaps S set to be slightly smaller than the outer diameter of each long object TK, the pairs of extensions 15 are elastically deformed by pushing each long object TK into the accommodation space SK in the links 13 from the outside through the gaps S. This enlarges the gaps S to be greater than the outer diameter of each long object TK and allows the long object TK to be accommodated in the accommodation space SK. After each long object TK is accommodated in the accommodation space SK, the pairs of extensions 15 return to the original shape by the elastic restoration force of the pairs of extensions 15. The gaps S between the pairs of extensions 15 also return to the original size. Thus, the long objects TK are easily accommodated in the accommodation space SK from the outside, and the long objects TK accommodated in the accommodation space SK are restrained from coming out through the gaps S between the pairs of extensions 15.

(5) In the long object guiding device 11, the width of the extensions 15 in the serial direction X is set to be narrower than the width of each arm 14 in the serial direction X. Thus, the pairs of extensions 15 are elastically deformed easily compared with a case in which the width of the extensions 15 in the serial direction X is greater than or equal to the width of each arm 14 in the serial direction X. Thus, the long objects TK are more easily accommodated in the accommodation space SK in the links 13 from the outside through the gaps S between the pairs of extensions 15.

MODIFICATIONS

The above embodiment may be modified as follows.

The width of the extensions 15 in the serial direction X does not necessarily have to be narrower than the width of each arm 14 in the serial direction X. That is, the width of the extensions 15 in the serial direction X may be the same as or greater than the width of each arm 14 in the serial direction.

In each link 13, an openable arm that couples the pair of link portions 12 may be employed instead of the pair of extensions 15.

Each link 13 does not necessarily have to be a single component. That is, each link 13 may be configured by assembling multiple components.

In each link 13, the second engaging portions 32 may be omitted.

In the long object guiding device 11, when two links 13 that are adjacent to each other in the serial direction X are located in the second state, the angle between these two links 13 does not necessarily have to be set to 60 degrees. That is, in two links 13 located in the second state, the angle between the longitudinal axes of the link portions 12 of one of the links 13 and the longitudinal axes of the link portions 12 of the other link 13 does not necessarily have to be set to 60 degrees. For example, the angle between these two links 13 in the second state may be set to 45 degrees or 70 degrees.

In the long object guiding device 11, when two links 13 that are adjacent to each other in the serial direction X are located in the third state, the angle between these two links 13 does not necessarily have to be set to 30 degrees. That is, in two links 13 located in the third state, the angle between the longitudinal axes of the link portions 12 of one of the links 13 and the longitudinal axes of the link portions 12 of the other link 13 does not necessarily have to be set to 30 degrees. For example, the angle between these two links 13 in the third state may be set to 15 degrees or 40 degrees.

In each link 13, the size of the gap S between the pair of extensions 15 may be changed as required in accordance with the outer diameter of the long object TK to be accommodated in the accommodation space SK.

Each link 13 may include multiple pairs of extensions 15.

In each link 13, the arm 14 and the pair of extensions 15 do not necessarily have to be located to face each other in the thickness direction Z.

The links 13 may be made of metal or wood.

In each link 13, the first inclined surfaces 27a, which configure the distal end surfaces of the protruding portions 27, may be changed to flat surfaces that extend in the serial direction X and the width direction Y.

In each link 13, the second inclined surfaces 29 may be omitted.

DESCRIPTION OF THE REFERENCE NUMERALS

11 . . . long object guiding device, 12 . . . link portion, 13 . . . link, 13a . . . first link, 13b . . . second link, 14 . . . arm, 15 . . . extension, 31 . . . first engaging portion, 32 . . . second engaging portion, 35 . . . first restricting member, which configures restricting portion, 36 . . . second restricting member, which configures restricting portion, K . . . opening portion, S . . . gap, TK . . . long object, X . . . serial direction (second direction), Y . . . width direction (first direction), Z . . . thickness direction (third direction).

The invention claimed is:

1. A long object guiding device, the device comprising a plurality of links pivotally coupled to each other, wherein
each link includes a pair of link portions that face each other in a first direction,
the links are pivotally coupled together in a state in which the links are arranged in series in a second direction orthogonal to the first direction,
the links include a first link and a second link that are adjacent to each other in the second direction,
the first link and the second link are pivotal between a first state, in which longitudinal axes of the link portions of the first link match with longitudinal axes of the link portions of the second link, and a second state, in which the longitudinal axes of the link portions of the first link intersect with the longitudinal axes of the link portions of the second link,
each link portion includes
a first engaging portion provided at a first end in the second direction,
a restricting portion located apart from the first engaging portion in the second direction,
wherein, when the restricting portion of each link portion is aligned, in the first direction, with the first engaging portion of the link portion that is adjacent in the second direction, the restricting portion restricts movement of the first engaging portion of the adjacent link portion in the first direction, and
a second engaging portion located at the first end in the second direction adjacent to the first engaging portion,
the restricting portion includes a first restricting member and a second restricting member,
an opening portion is formed between the first restricting member and the second restricting member,
when the first link and the second link are located in the first state, the first engaging portion of the second link is aligned with the first restricting member of the first link in the first direction, and the second engaging portion of the second link is aligned with the second restricting member of the first link in the first direction,
when the first link and the second link are located in the second state, the first engaging portion of the second link is aligned with the second restricting member of the first link in the first direction, and
when the first link and the second link are located in a third state between the first state and the second state, the first engaging portion of the second link is aligned with the opening portion of the first link in the first direction.

2. The long object guiding device according to claim 1, wherein each link is a single component.

3. The long object guiding device according to claim 1, wherein
a direction orthogonal to the first direction and the second direction is a third direction,
each link further includes
an arm that couples the pair of link portions at a first end in the third direction, and
a pair of extensions extending inward from the pair of link portions in the first direction at a second end in the third direction, wherein the extensions face each other and are elastically deformable, and
a gap is formed between the pair of extensions.

4. The long object guiding device according to claim 3, wherein a width of each extension in the second direction is narrower than a width of each arm in the second direction.

* * * * *